United States Patent
Davis et al.

(10) Patent No.: US 7,160,470 B2
(45) Date of Patent: Jan. 9, 2007

(54) METHOD OF CLARIFYING INDUSTRIAL LAUNDRY WASTEWATER USING CATIONIC DISPERSION POLYMERS AND ANIONIC FLOCCULENT POLYMERS

(76) Inventors: Robert A. Davis, 1791 Arbor Dr., Fernandina Beach, FL (US) 32034; Stuart G. Davis, 2850 1st Ave., Fernandina Beach, FL (US) 32034

( * ) Notice: Subject to any disclaimer, the term of this patent is extended or adjusted under 35 U.S.C. 154(b) by 78 days.

(21) Appl. No.: 10/827,141

(22) Filed: Apr. 19, 2004

(65) Prior Publication Data

US 2005/0230318 A1 Oct. 20, 2005

(51) Int. Cl.
*C02F 1/56* (2006.01)
*C02F 11/14* (2006.01)

(52) U.S. Cl. ............... 210/708; 210/710; 210/727; 210/728

(58) Field of Classification Search ........... 210/728
See application file for complete search history.

(56) References Cited

U.S. PATENT DOCUMENTS

| | | | |
|---|---|---|---|
| 4,800,039 A * | 1/1989 | Hassick et al. ........... 252/181 |
| 5,045,214 A | 9/1991 | Walker | |
| 5,167,829 A | 12/1992 | Diamond et al. | |
| 5,433,853 A * | 7/1995 | Mamone ................. 210/615 |
| 5,807,487 A * | 9/1998 | Lahti ..................... 210/665 |
| 5,948,270 A * | 9/1999 | Hassick .................. 210/727 |
| 6,036,868 A * | 3/2000 | Sivakumar et al. ......... 210/708 |
| 6,048,438 A | 4/2000 | Rosencrance et al. | |
| 6,120,690 A * | 9/2000 | Haase .................... 210/728 |
| 6,159,376 A | 12/2000 | Lahti | |
| 6,171,505 B1 | 1/2001 | Maury et al. | |
| 6,319,412 B1 * | 11/2001 | Reyna ................... 210/666 |
| 6,398,967 B1 | 6/2002 | Sparapany et al. | |
| 6,863,826 B1 * | 3/2005 | Sheets .................. 210/705 |

* cited by examiner

*Primary Examiner*—Peter A. Hruskoci
(74) *Attorney, Agent, or Firm*—Arthur G. Yeager

(57) ABSTRACT

Methods are described for removing contaminates from aqueous industrial wastewater process streams, specifically industrial laundries to yield a less contaminated aqueous effluent for discharge to a sewer and reduce the sludge generated therefrom. A premixed medium/high molecular weight and medium/high charged cationic coagulant solution polymer and an inorganic aluminum species is injected into the wastewater, and after at least a two second delay, a high molecular weight highly charged anionic flocculent polymer solution is injected into the wastewater which reduces sludge generation, while maintaining or exceeding effluent quality. Also, no coagulant, flocculent or sludge aids are needed to attain the results and the sludge can be dewatered in a plate and frame press.

4 Claims, 1 Drawing Sheet

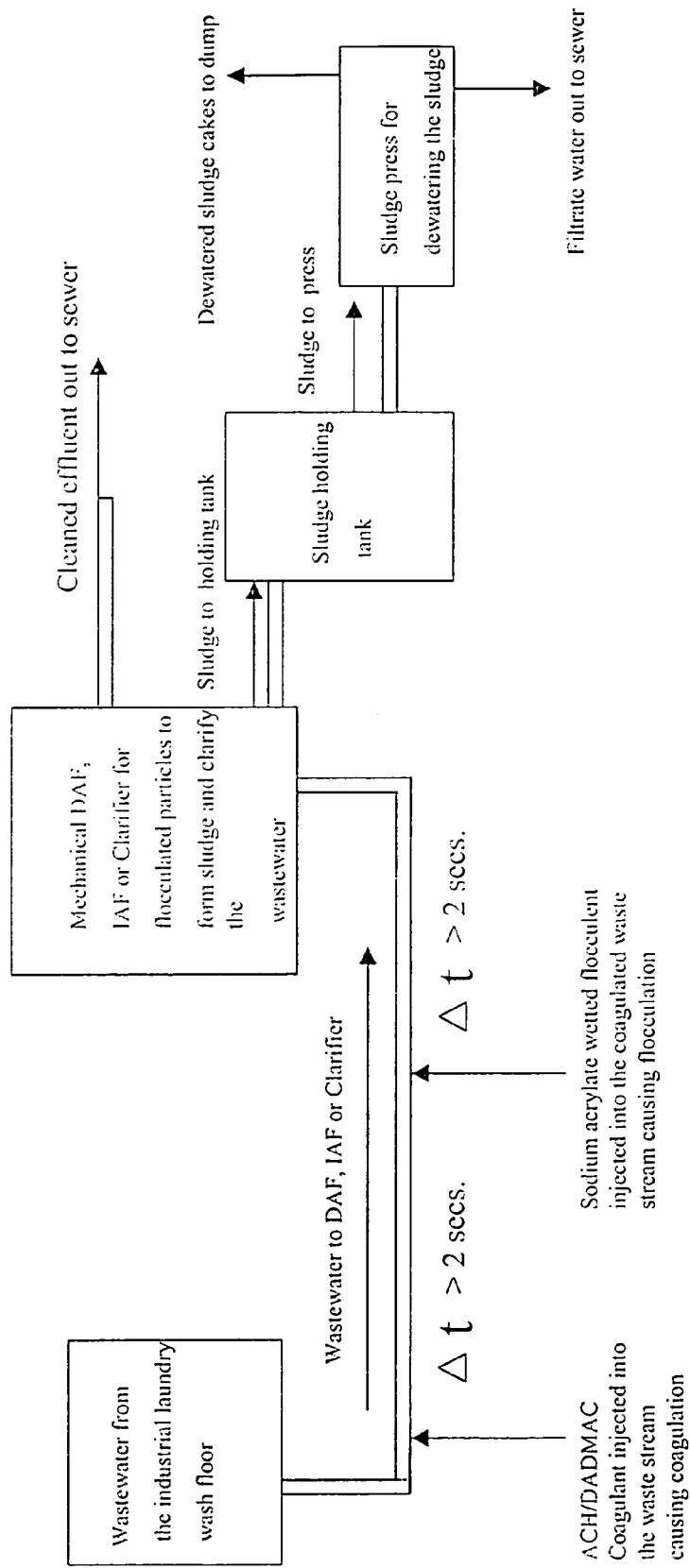

METHOD OF CLARIFYING INDUSTRIAL LAUNDRY WASTEWATER USING CATIONIC DISPERSION POLYMERS AND ANIONIC FLOCCULENT POLYMERS

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

TECHNICAL FIELD

This invention is directed to methods of clarifying industrial wastewater, specifically industrial laundry wastewater that includes wastewater from light to heavy product mix industrial laundry plants utilizing both full and split streams as defined by a client-user.

BACKGROUND OF THE INVENTION

In the laundry wastewater treatment field of solids/liquid separation, suspended and emulsified solids are removed from water by a variety of processes, including sedimentation, straining, flotation, filtration, coagulation, flocculation, and emulsion breaking among others. Additionally, after solids are removed from the wastewater they must often be dewatered. Liquids treated for solids removal often have as little as several parts per million (ppm) of suspended solids or dispensed oils, or may contain several thousand ppm of suspended solids or oils. Solids being generated as sludge may contain anywhere from 0.1 to 6 weight percent solids prior to dewatering, and from 20 to 50 weight percent solids material after dewatering by a plate and frame press. Solids/liquid separation processes are designed to remove solids from liquids and the more solids generated in the process, the more costly its disposal.

While strictly mechanical means have been used to effect solids/liquid separation, the modern methods often rely on mechanical separation techniques that are augmented by synthetic and natural polymeric materials to accelerate the rate at which solids can be removed from water. These processes include the treatment of wastewater with cationic organic and inorganic coagulants that coagulate suspended particulates to form larger particles that then may be brought together by an anionic flocculent to create particles large enough to be removed from the waste stream by mechanical means, i.e., flotation or clarification, and make the effluent suitable for industrial reuse or disposal in compliance with local permit discharge requirements.

In the industrial laundry industry, the chemical treatment of wastewater to a typical municipal standard of 100 ppm of oil and grease (EPA method 1664) prior to the introduction of this invention has been: the hydraulic equalization of untreated wastewater followed by the metered flow of the wastewater through a pipe or tanks to provide for retention time for the injection of a variety of chemicals including combinations and individually, both organic and inorganic coagulants and aids, followed by an organic component flocculent to produce coagulation and flocculation. These inorganic components used for coagulation or coagulation aids, typically have simple hydration factors of approximately 6–12 water molecules and may also be used in conjunction with a separate component, i.e. perlite or diatomaceous earth or bentonite clay, to act as a "body builder" to produce sludge so that in down stream processes it may be dewatered. A variety of organic and inorganic coagulants and aids exist throughout the marketplace. Historical data has shown that used in correct combination these chemistries can produce suitable effluent with sludge generation of approximately 1.1 to 2.5% of influent flow, whereas by use of this invention sludge production is reduced to approximately 0.25 to 1.0% of influent flow.

Chemical treatment generally refers to the removal of nonsettleable material by coagulation and flocculation. Chemical treatment for wastewater clarification is typically employed when colloidal and microemulsified solids need to be removed so that the total petroleum hydrocarbons (TPH), fat, oil and grease (FOG), biochemical oxygen demand (BOD), chemical oxygen demand (COD), total suspended solids (TSS), and other contaminants being discharged to a receiving stream need to be minimized. Typically, such treatment comprises using a cationic coagulant with one or more inorganic components, injected in combination or individually, followed by an anionic flocculent. Coagulation is the process of destabilization of the colloid waste particle by causing the coagulant (at 50–1000 ppm) to absorb by means of charge neutralization to form microfloc and impart residual cationic surface charge of the coagulated particles. The second step is to introduce a coagulant aid, i.e., ferric chloride, aluminum sulfate, ferrous sulfate, calcium chloride, polyaluminum chloride, typically at a rate of 75–700 ppm depending on the species, to increase the ability to form a more highly cationic surface that will cause the further adsorption of the coagulated particles onto the surface of an additional chemical, usually bentonite clay, at 200–900 ppm through a "sponge" effect. Flocculation occurs when the highly charged anionic flocculent bridges the previously formed cationic particles. Once neutralized, particles no longer repel each other and can come together to form larger agglomerated solids or sludge, which may then be removed from the water. The third step that is occasionally taken is the addition of sludge thickeners that assist in allowing the sludge to dewater, i.e. perlite, bentonite clay, diatomaceous earth and others. This invention is specifically directed to eliminating the second and/or third steps, i.e., the addition of coagulant aids and or sludge thickeners and a resultant reduction of the formation of sludge by up to 80% compared to previous historically used methods.

Clarification chemicals are typically utilized in conjunction with mechanical clarifiers including dissolved air flotation systems (DAFs), induced air flotation systems (IAFs), and settlers for the removal of solids from the treated water. The clarification chemicals coagulate and/or flocculate the suspended solids into larger particles, which can then be removed from the water by gravitational settling, flotation, or other mechanical means.

Processes for the preparation of high molecular weight cationic dispersion polymer flocculents are described in U.S. Pat. Nos. 5,006,590 and 4,929,655. High molecular weight, high active polymer cationic solution polymers for water clarification, dewatering and retention and drainage are disclosed in U.S. Pat. No. 6,171,505.

BRIEF SUMMARY OF THE INVENTION

The invention is directed to methods of clarifying industrial wastewater, specifically industrial laundry wastewater, to produce a compliant effluent and a reduction of sludge of between 30%–80%, using a two part system of a pDAD-MAC/ACH blended coagulant followed by a poly(acrylamide-co-acrylate) flocculent. Furthermore, the sludge produced using this invention will dewater in a typical plate and frame press without the use of any other organic or inorganic compounds added to the waste stream or sludge.

This invention pertains to the use of a cationic aqueous solution containing a mostly equal blend of a 50% ratio of approximately a 2–35% concentration of solids by weight of polydiallydimethylammonium chloride (pDADMAC) organic polymer and a combination of epichlorohydrin-quaternaryammonium species where pDADMAC is the major constituent, together with approximately 5–40% concentration of solids by weight of aluminum chlorohydrate (also known by other names i.e. ACH, also known as partially neutralized polyaluminum chloride) an inorganic compound utilized as a coagulant (along with a combination of other chloride species where ACH is the major constituent) in the chemical demulsification of laundry wastewater to produce cationic charged particles.

The wastewater is cleaned using a medium to high molecular weight medium to very highly charged cationic solution coagulant (polymer) premixed with an inorganic aluminum species as one product, followed by a high to very high molecular weight anionic flocculent, I.e., poly(acrylamide-co-acrylate), (also known herein as sodium acrylate flocculent) with a 35% charge or higher (preferably 50% or higher), added in solution to produce particulate of sufficient size to be removed by physical means without the use of secondary, tertiary, or quaternary coagulation or flocculation aids. The wastewaters, to which this invention is directed, may be produced by the industrial cleaning of products including but not limited to: uniforms, shop towels, ink towels, mats, rugs, bar mops, aprons, coveralls and coats, used to protect personnel from manufacturing or commercial wastes.

The creation of the wastewater stream can be through the use of all available commercial equipment that is used for washing the various products. These streams must then be collected in such a way as to promote the batch collection or intermittent or continuous flow of the stream. This collection of wastewater then may be further treated by batch or flow proportion as to allow for the injection and mixing of treatment chemicals by primary coagulation and flocculation only. This invention cleans the wastewater and reduces the sludge generation by as much as 80% from traditional methods of industrial laundry wastewater treatment, resulting in the elimination of additional in-stream and downstream additives. Furthermore, at the proper doses, this invention allows the sludge to be dewatered in a typical plate and frame press or other equipment used for the dewatering of sludge.

The specific invention herein relates to the wastewater batch, or the in-stream use of the coagulant polymer compound containing pDADMAC coagulant and ACH injected into the wastewater stream in a diluted or an undiluted form, at any point prior to the sodium acrylate acrylamide flocculent injection with at least a two (2) second interval between the injections. The coagulant must be injected in the correct empirical quantity and given sufficient predetermined time to begin and complete the coagulation of the waste particles and the flocculent must be injected in the correct empirical quantity and given sufficient time to begin and complete the flocculation of the coagulated particles prior to dewatering. The coagulant and flocculent must be injected in sufficient quantity to create the conditions in the sludge that allow for the dewatering of the sludge generated by this process. These injection or dosing ratios are critical to the overall performance of the invention.

The dry anionic flocculent is wetted into any solution strength commonly between 0.05–0.5%, 0.2% being preferred, and injected post coagulant by at least a two (2) second interval and in sufficient empirical quantities as to cause coagulated wastewater to form flocculated waste particles of sufficient size to settle in clarification or rise by flotation, as by dissolved/induced air or other means.

The combination of the coagulant and the flocculent in the waste-stream produces a sludge volume 30–80% less than with those previous laundry wastewater treatments which utilize additional treatment chemicals or aids. The process testing of this invention has shown these reductions to be typical of the specific application of the invention disclosed herein.

The flocculents of this invention must be of sufficient charge density, molecular weight and added in sufficient quantities, as to aid in all dewatering mechanisms, typically being a plate and frame press often found in typical plants.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, which illustrates schematically an industrial laundry wastewater treatment system embodying features of this invention.

DETAILED DESCRIPTION OF THE INVENTION

In accordance with the present invention, methods are provided for removing contaminants from an aqueous solution.

Methods are provided for removing: surfactants, phenolics, total petroleum hydrocarbons, fats oil and grease, TSS contributors, BOD contributors, COD contributors, and TOC contributors from an aqueous solution. The surfactants, phenolics, total petroleum hydrocarbons, fats, oil and grease (FOG), TSS contributors, BOD contributors, COD contributors, and TOC contributors from an aqueous solution are removed by adsorption onto a carrier precipitate which is formed in situ within the aqueous solution. In each of the embodiments of the invention the preferred method involves rapidly forming the precipitate.

The method of the invention can be used to remove the following contaminants from the laundry wastewater stream: TSS contributors, BOD contributors, COD contributors, TOC contributors, and/or fats, oil and grease (FOG). The invention will now be described first with respect to FOG, TSS contributors, BOD contributors. COD contributors, and TOC contributors. Unless otherwise stated, all process and apparatus parameters disclosed for FOG removal are equally effective for the removal of the other contaminants as well. Likewise, unless otherwise stated, all process and apparatus parameters disclosed for the removal of the other non-volatile contaminants are equally effective for heavy metal removal as well.

"Coprecipitation" as used with respect to the invention described herein refers to the chemical phenomenon where, within an aqueous solution containing a cationic carrier precipitate precursor, an anionic carrier precipitate precursor, and one or more coprecipitant precursors, the cationic and anionic carrier precipitate precursors are caused to chemically react and precipitate out of the aqueous solution as carrier precipitate particles; and, as the carrier precipitate particles are formed, coprecipitant precursors are removed from the aqueous solution by adsorption onto the surface of the carrier precipitate particle and/or by occlusion within the interior of the carrier precipitate particle.

The coprecipitant reaction is very rapid. Typically, more than 85 weight percent, and usually more than ninety-nine (99) weight percent, of the oil and grease are removed from the waste solution within about one minute after the formation of the agglomerated particle.

Finally, the methods of the invention are superior to conventional precipitation methods in that these methods also produce less precipitate sludge. The lower sludge production stems, in part, from the removal of separately or blended inorganic components including but not limited to: ferric chloride, ferrous sulfate, polyaluminum chloride, bentonite clay, perlite, diatomaceous earth, aluminum chloride (except for the blend of 20% pDADMAC and 20% aluminum chlorohydrate used in accord with this invention).

The aqueous polymeric coagulant pDADMAC is made by several manufacturers and of pre-described weight percent of solids combined with the pre-described aqueous polyaluminum chloride. The first chemical of the invention is mixed in controlled conditions with water to produce a cationic blend polymer and then injected into the waste stream in empirical quantities of 50–700 parts per million (ppm), depending primarily on stream flow rate or strength to cause the coagulation of negatively charged waste particles.

The resulting coagulated particles then have sufficient mass and residual cationic charge to react with the subsequent addition of the pre-described, wetted, water dispersed dry anionic flocculent to create an agglomerated particle of sufficient size for removal by mechanical means. The flocculent is injected into the waste stream after a predetermined time to permit the cationic blend to substantially complete the coagulation of the particles by at least two (2) seconds after the injection of the coagulant blend in empirical quantities of 5–50 ppm. This dose of flocculent is critical to not only the flocculation of the coagulated particles but to the later dewatering of the sludge. If either insufficient or excessive flocculent is injected into the wastewater stream, the sludge will not appropriately dewater.

The time interval for the coagulant to sufficiently absorb the waste particles prior to injection of the flocculent must be no less than two (2) seconds and no longer than ten (10) minutes. Sufficient passive or active mechanical action must take place between the wastewater and the coagulant as to allow the intimate commingling of the waste particles with the coagulant prior to addition of the flocculent.

The dry anionic flocculent must be of a molecular weight as termed in the industry as "very high" and of a charge density of no less than thirty-five percent (35%) but usually around fifty percent (50%). Again depending on wastewater stream strength the preferred range of 7–30 ppm of flocculent is needed to flocculate the coagulated particles to a level where the additional use of other coagulant aids and/or dewatering aids is not necessary.

Using this invention, typical sludge generation is reduced 30–80% which equates to 0.2 to 0.6% of sludge being produced of the influent flow and after typical dewatering using a plate and frame press the sludge is reduced another 50%. This compares to other typical treatments utilizing the above described three part systems or others generating 0.8 to 2.5% of the influent flow as sludge. Dewatering characteristics of the sludge in other prior art systems vary from system to system and do cause an additional "body feed" to the sludge in order to achieve dewaterability.

The following examples, are set forth to illustrate this invention and render same more understandable but are not intended to limit the scope of the herein disclosed and claimed invention.

EXAMPLE ONE

Laundry plant #1 with a daily average water usage of 110,000 gallons per day with 50% of the input product being shop towels, mats, ink wipers and other heavy soils was producing 1.1% of their daily wastewater as liquid sludge. The prior existing program being used for industrial pretreatment was a poly(diallydimethylammonium chloride) solution with a dose rate of 200–500 ppm coupled with the use of a six percent bentonite clay fed at the rate of 600 ppm, residence time for each chemical was 15–20 seconds at 125 gpm flow. This created coagulated particles that were then flocculated with a 0.2% polyacrylate flocculent at 6–8 ppm to produce particles able to be floated through mechanical means. The plate and frame press produced dewatered sludge cakes amounting to 135 cubic feet per day.

The method of this invention was used to replace the then existing program with a dose rate of 200–400 ppm of coagulant using a mix time of approximately 20 seconds, and the application of the flocculent at 20–30 ppm using a mix time of approximately 40 seconds, resulting in floc that was floated through mechanical means. The amount of sludge produced was 0.3% of the influent flow thereby resulting in a dewatered sludge reduction of 66%. Since the application of this invention to plant #1, all required effluent parameters have been compliant with EPA requirements.

The effect on the plate and frame dewatering press was a reduction in the final amount of dewatered sludge to 45 cubic feet per day, thus reducing disposal costs of the sludge, as well as substantial savings in treatment chemicals and other additives used in the prior program.

EXAMPLE TWO

A newly installed dissolved air flotation wastewater system at Plant #2 began utilization of the methods of this invention for chemical treatment of the wastewater at start-up. The volume of water produced by the facility was approximately 70,000 gallons per day and the product mix comprised mostly of heavily grease-laden linen from the food industry. The methods of the invention were applied at 300–600 ppm using a mix time of approximately 15 seconds of coagulant and 25–45 ppm of flocculent using a mix time of approximately 30 seconds, resulting in floc able to be floated through mechanical means, with a resulting sludge production of 0.3% of the influent flow. Since the application of the invention, all required effluent parameters have been compliant with EPA requirements.

Treatment in accord with this invention resulted in an influent reduction of 421 ppm of biochemical oxygen demand (BOD) to <5.3 ppm (method EPA 405.1), and 360 ppm to <5.0 ppm oil and grease (method EPA 1664).

The effect on the plate and frame dewatering press was to produce only 25 cubic feet of dewatered sludge per day.

These examples one and two exemplify the consistent results achievable by this invention. While the dewatered sludge from Plant #2 could have been expected to amount to about 28.6 cubic feet, if the wastewater from the two plants were the same. Also, the newer equipment and other noted differences in the dosage and differing effluents will cause various results while being considered consistent in accord with this invention.

EXAMPLE THREE

An industrial laundry with an average flow of 80,000 gallons per day treated the wastewater with a pDADMAC coagulant coupled with an aluminum salt (200–400 ppm) injected prior to the transfer pump and bentonite clay (600–900 ppm) injected 15 seconds later and sodium acrylate flocculent (7 ppm) 15 seconds down stream. Water was non compliant with a reading of eight (8) on a standard turbidity wedge. Sludge production for the facility was 1100 gallons per day. Filter cakes were not forming inside of the press which necessitated hauling away the liquid sludge.

After replacement of the above-described program in accord with this invention at 250 ppm of coagulant being injected prior to the transfer pump and 30 ppm of flocculent being injected at the former clay injection point, sludge was reduced to 350 gallons per day. The plant became compliant with 35+ on a standard turbidity wedge. This new process formed sludge cakes by the press amounting to 7 cubic feet per day, and substantial savings in disposal costs were achieved.

Presented in Table 1 are the results of Total Contained Leaching Process (TCLP) data used for determining the long-term hazardous effects of dewatered sludge. The TCLP approximates under laboratory conditions what the sludge will discharge during decomposition into the surrounding environment as known hazardous components. Table 1 is the qualitative analysis of those hazardous components taken from sludge cake utilizing a prior method including bentonite clay (year 2002) and those utilizing the method in accord with this invention (year 2003).

TABLE 1

| ANALYTE | TCLP 2002 Before Invention | | TCLP 2003 After Invention | | METHOD |
|---|---|---|---|---|---|
| | RESULT | UNITS | RESULT | UNITS | |
| BENZENE | <0.001 | ppm | <0.01 | ppm | 8260 |
| CARBON TETRACHLORIDE | <0.001 | ppm | <0.01 | ppm | 8260 |
| CHLOROBENZENE | <0.001 | ppm | <0.01 | ppm | 8260 |
| CHLOROFORM | <0.005 | ppm | <0.01 | ppm | 8260 |
| DICHLOROBENZENE, 1,4- | <0.005 | ppm | 0.016 | ppm | 8260 |
| DICHLOROETHANE, 1,2- | <0.005 | ppm | <0.01 | ppm | 8260 |
| DICHLOROETHYLENE, 1,1- | <0.005 | ppm | <0.01 | ppm | 8260 |
| METHYL ETHYL KETONE | <0.019 | ppm | <0.01 | ppm | 8260 |
| TETRACHLOROETHYLENE | <0.017 | ppm | <0.113 | ppm | 8260 |
| TRICHLOROETHYLENE | <0.005 | ppm | <0.01 | ppm | 8260 |
| VINYL CHLORIDE | <0.002 | ppm | <0.001 | ppm | 8260 |
| CRESOL, M&P | <0.1 | ppm | <0.05 | ppm | 8270 |
| CRESOL, 0- | <0.15 | ppm | <0.1 | ppm | 8270 |
| DINITROTOLUENE, 2,4- | <0.01 | ppm | <0.05 | ppm | 8270 |
| HEXACHLOROBENZENE | <0.01 | ppm | <0.05 | ppm | 8270 |
| HEXACHLOROBUTADIENE | <0.005 | ppm | <0.05 | ppm | 8270 |
| HEXACHLOROETHANE | <0.005 | ppm | <0.05 | ppm | 8270 |
| NITROBENZENE | <0.05 | ppm | <0.05 | ppm | 8270 |
| PENTACHLOROPHENOL | <0.05 | ppm | <0.05 | ppm | 8270 |
| PYRIDINE | <0.1 | ppm | <0.1 | ppm | 8270 |
| TRICHLOROPHENOL, 2,3,5- | <0.05 | ppm | <0.05 | ppm | 8270 |
| TRICHLOROPHENOL, 2,4,6- | <0.05 | ppm | <0.05 | ppm | 8270 |
| CHLORDANE | <0.01 | ppm | <0.01 | ppm | 8270i |
| ENDRIN | <0.01 | ppm | <0.01 | ppm | 8270i |
| HEPTACHLOR | <0.01 | ppm | <0.008 | ppm | 8270i |
| HEPTACHLOR EPOXIDE (BETA) | <0.008 | ppm | <0.008 | ppm | 8270i |
| LINDANE | <0.01 | ppm | <0.01 | ppm | 8270i |
| METHOXYCHLOR | <0.05 | ppm | <0.01 | ppm | 8270i |
| TOXAPHENE | <0.1 | ppm | <0.01 | ppm | 8270i |
| 2,4 D | <0.002 | ppm | <0.02 | ppm | 8151 |
| 2,3,5-TP SILVEX | <0.002 | ppm | <0.02 | ppm | 8151 |
| ARSENIC, As | <0.01 | ppm | <0.001 | ppm | 7060 |
| BARIUM, Ba | 0.478 | ppm | <0.1 | ppm | 7080 |
| CADMIUM, Cd | <0.01 | ppm | <0.01 | ppm | 7130 |
| LEAD, Pb | 0.051 | ppm | <0.1 | ppm | 7421 |
| CHROMIUM, Cr | 0.049 | ppm | <0.01 | ppm | 7190 |
| MERCURY, Hg | <0.001 | ppm | <0.02 | ppm | 7470 |
| SELENIUM, Se | <0.02 | ppm | <0.02 | ppm | 7740 |
| SILVER, Ag | <0.005 | ppm | <0.05 | ppm | 7760 |
| METALS, DIGESTION FOR | 1 | ea sample | 1 | ea sample | 3030 D |
| SOLIDS | 100 | percent | 100 | percent | 1311 |
| CORROSIVITY Ph >12.5 or <2 | 5.1 | units | 5.9 | units | 9040 |
| IGNITABILITY | >140 | .F | >140 | .F | 1010 |

TABLE 1-continued

| ANALYTE | TCLP 2002 Before Invention | | TCLP 2003 After Invention | | |
|---|---|---|---|---|---|
| | RESULT | UNITS | RESULT | UNITS | METHOD |
| TOTAL RELEASABLE CYANIDE | <0.01 | mg/kg | <0.009 | ppm | 9010 |
| TOTAL RELEASABLE SULFIDE | <0.5 | mg/kg | <0.5 | ppm | 9030 |
| REACTIVITY | =0 | Negative | =0 | Negative | Exam |
| TCLP SEMI/NON-VOLATILES EXTRACT | 1 | ea | 1 | ea | 1311 |
| TCLP VOLATILES EXTRACT | 1 | ea | 1 | ea | 1311 |

It can be extrapolated from the above two sets of data that neither TCLP has components in sufficient quantities as to categorize the sludge as hazardous under most current regulations for the disposal of sludge.

EXAMPLE FOUR

An industrial laundry whose wash mix is a majority of heavy soil products treated their wastewater with separately fed injections of 20% solids by weight pDADMAC (200–500 ppm) followed approximately 20 seconds later by a second injection of polyaluminum chloride (400–800) and in approximately 10 seconds an injection of sodium acrylate flocculent to produce EPA and municipal non-compliant effluent (eight on a standard turbidity wedge) and approximately 2200 gallons of sludge with a daily flow of 120,000 gallons of wastewater per day. In order for the facility to dewater the sludge by plate and frame press method, 350 pounds of diatomaceous earth was added as a body feed to produce a sludge cake.

After elimination of the previous treatment program and introduction of the methods in accord with this invention, the plant became compliant (35+ on a standard turbidity wedge) and the amount of sludge produced was approximately 600 gallons per day. The body feed of Kenite (perlite), needed to produce sludge cake, was eliminated. The coagulant injected at the intake side of the transfer pump was at 150–300 ppm and the flocculent was injected approximately 20 seconds later at 35 ppm. Effluent testing done by a local laboratory showed total petroleum hydrocarbons to be 4 mg/l, which was well within EPA and municipal limits.

EXAMPLE FIVE

This plant was an industrial laundry with an average daily flow of 70,000 gallons and a mixed product load requiring treatment of the wastewater to meet local limits. An epi-quanternary amine coagulant was being injected prior to the wastewater transfer pump at 500 ppm with an injection of technical grade ferric chloride at 250 ppm into a chemical reaction tank with two minutes detention time at 75 gallons per minute. Then it was gravity fed to a second tank and a sodium acrylate emulsion polymer was fed at 10 ppm. The sludge produced daily was approximately one percent (1%) of the daily flow (700 gallons) and was being hauled for disposal as a liquid.

After removal of the above process and incorporating the process in accord with this invention with the coagulant injection point being at the first tank at 400 ppm and the flocculent fed at 25 ppm into the second tank, the effluent quality was clear at 35 on a standard turbidity wedge. Sludge was reduced to 0.5% (350 gallons) of the influent and was hauled for disposal as a liquid because this plant had no plate and frame press.

EXAMPLE SIX

This plant was an industrial laundry out of compliance on all parameters. At 70,000 gallons per day the facility was producing 1100 gallons of sludge and needed to add as much as 600 pounds of bentonite clay for treatment and as a body feed for sludge dewatering. The treatment scheme utilized at the time was an epi-amine/DADMAC (400–600 ppm) combination coagulant followed by bentonite clay injection (600–1200 ppm) and sodium acrylate flocculent (7–10 ppm).

As shown on Table Two, once the prior process was abandoned and the process in accord with this invention was introduced, the plant became compliant with local standards. Injection of the coagulant was made prior to the intake side of the wastewater transfer pump with a five second interval for the injection of the flocculent. Sludge was reduced to 300–350 gallons per day with 25 cubic feet of sludge being produced after plate and frame dewatering.

TABLE TWO

| PARAMETER | LIMIT | Before Invention | After Invention |
|---|---|---|---|
| BIOCHEMICAL OXYGEN DEMAND | 300 mg/L | 1110 mg/L | 120 mg/L |
| OIL & GREASE (TOTAL | 100 mg/L | 187 mg/L | 5.2 mg/L |
| pH Acidic | <5.5 | 7.58 | 9.33 |
| pH Basic | >11.5 | 7.58 | 9.33 |
| TOTAL SUSPENDED SOLIDS | 300 mg/L | 1555 mg/L | 26 mg/L |

It is to be noted that under extremely limited conditions, a plant may introduce a small amount of bentonite clay, for example, into the waste stream at approximately two to six seconds after the addition of the coagulant and before the addition of the flocculent, in the herein disclosed method, as a sludge conditioner. Though this is not necessary with this invention, when the waste stream is extremely heavy in oil and grease components (over 1000 ppm), the clay will assist in the dewatering of the sludge. The addition of the clay to be added should be in a much smaller quantity (less than 200 ppm) than used in the prior art methods, i.e., without the use of the present invention. The clay is used for conditioning the sludge only, and not for achieving effluent quality standards, which are attained without clay addition.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method of clarifying industrial laundry wastewater containing surfactants, fats, oil and grease (FOG), total petroleum hydrocarbon (TPH), biochemical oxygen demand (BOD), chemical oxygen demand (COD), total suspended solids (TSS), ionized metals and other contaminants, and dewatering of the sludge in the wastewater using a plate and frame sludge press, consisting essentially of the steps of:
   (a) adding to the wastewater an effective amount of a water dispersed cationic blended coagulant of approximately 2–35% by solids weight of polydiallyldimethylammonium chloride (pDADMAC) and approximately 5–40% by solids weight of aluminum chlorohydrate (ACH); at between 50 ppm and 700 ppm to chemically demulsify the wastewater and produce coagulated particles having sufficient mass and cationic charge to react with an anionic flocculent to be added thereafter;
   (b) delaying any flocculent addition by at least two seconds to permit the cationic blended coagulant to substantially complete the coagulation of the particles in the wastewater in step (a);
   (c) adding to the wastewater an effective amount of a dry anionic poly(acrylamide-co-acrylate) flocculent which has been wetted to create a solution, at between 5 ppm and 50 ppm, of sufficient molecular weight and charge density to react with the cationic charged coagulated particles to form flocculated waste particles of effective size to form sludge while leaving a disposable clarified water;
   (d) separating the sludge from the clarified water;
   (e) passing the sludge to a plate and frame sludge press;
   (f) dewatering the sludge by the press, thereby forming a disposable sludge cake; and
   (g) disposing of the sludge cake and the clarified water.

2. The method of claim 1 wherein the cationic coagulant is essentially a blend of 20% by solids weight pDADMAC and 20% by solids weight ACH.

3. The method of claim 1 wherein the dry anionic flocculent is wetted to create:
   a solution strength of between 0.05 and 0.5% prior to the adding step (c).

4. The method of claim 1 wherein the dry anionic flocculent is wetted to create:
   a solution strength of 0.2% prior to the adding step (c).

* * * * *